Patented June 30, 1931

1,812,260

UNITED STATES PATENT OFFICE

HUGH ALBERT EDWARD DRESCHER, WILLIAM SMITH, AND JOHN THOMAS, OF GRANGEMOUTH, SCOTLAND, ASSIGNORS TO SCOTTISH DYES, LIMITED, OF GRANGEMOUTH, SCOTLAND

PROCESS FOR THE SEPARATION OF SUBSTITUTED α- AND β-AMINO ANTHRAQUINONES

No Drawing. Application filed July 20, 1926, Serial No. 123,792, and in Great Britain July 21, 1925.

This invention deals with the separation of substituted α- and β-amino anthraquinones with specific reference to the preparation of 2-amino-3-chlor anthraquinone, which as prepared applicants claim to be a new body.

The object of the invention is to provide improved or modified processes for preparing known anthraquinone derivatives or processes for producing new anthraquinone derivatives.

One of the usual methods of obtaining anthraquinone derivatives from benzoyl-benzoic acid bodies is to close the ring in the presence of sulphuric acid. The method when applied to (4'-halogen-3'-amino)-2-benzoyl benzoic acids involves the isolation and drying of the amino-halogen-anthraquinone.

Heretofore the body obtained by the condensation of (3'-amino-4'-chlor)-2-benzoyl-benzoic acid to an anthraquinone derivative, has been stated to be a single body with a melting point of 280° C. to 283° C.

We have carried out investigations on this body, and we have found that it is composed of at least two bodies which can be separated by making use of their different solubilities in sulphuric acids of certain concentration. These two bodies have melting points above about 300° C., and below about 200° C. respectively. They are valuable dyestuff intermediates.

As a result of this, the sulphuric acid melt after the ring closing can be diluted to the correct concentration for the separation of the appropriate bodies.

Further, by diluting the sulphuric acid melt after the ring closing to the correct concentration the β-amino-chlor-anthraquinone melting at about 310° C. to 311.5° C. can be separated as its sulphate, and the filtrates further treated down to about 55 per cent. for the purpose of obtaining the other apparently isomeric body melting at about 196° C. to 197° C.

Our invention consists in a process for the separation of substituted α- and β-amino anthraquinones for the preparation of 2-amino-3-substituted anthraquinone, which comprises the treatment of the product of condensation of (3'-amino-4'-substituted)-2-benzoyl-benzoic acid bodies by fractional precipitation from sulphuric acid or by fractional crystallization from concentrated hydrochloric acid or from organic solvents.

The invention also consists in processes substantially as set forth herein, and in products such as may be made by those processes or by their equivalents.

The following examples illustrate how the invention may be carried into effect, references to parts being to parts by weight:—

*Example 1.*—According to this example (3'-amino-4'-chlor)-2-benzoyl-benzoic acid is condensed in the presence of sulphuric acid to close the ring and form amino-chlor-anthraquinones.

After the sulphuric acid melt has been obtained this is diluted to the correct concentration, namely to a sulphuric acid concentration of about 80 per cent., to separate a product as a sulphate which after washing with water to hydrolize the sulphate and drying melts at about 310–311.5° C., being apparently β-amino-chlor anthraquinone. The filtrates are then treated by dilution to about 55 per cent. concentration, as a result of which a body which is apparently an amino-chlor anthraquinone is precipitated melting at about 196–197° C.

The first-mentioned body, namely, that melting at about 310–311.5° C., appears to be a chlorinated β-amino-anthraquinone body, and has the constitution represented by 2-amino-3-chlor anthraquinone. On bromination it yields a brominated amino-chlor-anthraquinone which condenses to form chlorinated indanthrones and flavanthrones.

The second-mentioned body, namely, that which melts at about 196–197° C., apparently has the constitution represented by 1-amino-2-chlor-anthraquinone. It is readily brominated, for example in weak sulphuric acid suspension or in nitrobenzene suspension, and it yields a mono-brom derivative, presumably 1-amino-2-chlor-4-brom-anthraquinone. This latter body condenses with organic bases, for example, aniline and para-toluidine, giving products which on sulphonation give rise to fast blue dyestuffs.

*Example 2.*—According to this example, 10 parts of the mixture of amino-chlor-anthraquinones melting at about 280–283° C. obtained by the condensation of (3'-amino-4'-chlor)-2-benzoyl-benzoic acid are dissolved in 60 parts of sulphuric acid of 100 per cent strength.

After solution is complete, 15 parts of water are added, the temperature being below 95° C. It is then finally heated to 120° C. for a short time and cooled to ordinary temperature. It is then allowed to stand for several hours and filtered. The filter cake thus obtained is washed with 80 per cent. sulphuric acid and then with water to free it from sulphuric acid after which it is dried. The product has a light yellowish brown colour and melts at about 310–311.5° C., and has the constitution represented by 2-amino-3-chlor-anthraquinone. The sulphuric acid filtrates are further diluted to 55 per cent. concentration by the addition of water, then heated to 110° C. to 120° C. for a short time, and cooled to atmospheric temperature. The base crystallizes out. This is filtered off and the cake washed with 55 per cent. sulphuric acid. It is finally washed with water to free it from acid and dried. The product is brick-brown in colour and melts at about 196–197° C., and is substantially 1-amino-2-chlor-anthraquinone.

*Example 3.*—Instead of amino-chlor-benzoyl-benzoic acid other (3'-amino-4'-substituted)-2-benzoyl-benzoic acids can be used, and when the two products are separated they can be treated to give bodies which are closely allied to the products mentioned above.

*Example 4.*—This illustrates the separation into two components of the product obtained on the nitration, reduction and condensation of (4'-substituted)-2-benzoyl-benzoic acids. Processes as described herein may be applied to bodies other than those mentioned therein, for example, the nitration of (4'-substituted)-2-benzoyl-benzoic acid gives products which on reduction and subsequent ring closing give rise to a mixture of substituted amino-anthraquinones. The method of separation described in the case of (3'-amino-4'-chlor)-2-benzoyl-benzoic acid may be used for the separation of the $\alpha$-amino body from the $\beta$-amino body, and this method substantially works also in the case of, for example, a (4'-methyl)-2-benzoyl-benzoic acid.

*Example 5.*—This is a modification of the sulphuric acid process of separation indicated in Examples 1 to 4. According to this example, separation of bodies as indicated above can be effected with solvents other than sulphuric acid, for example by crystallization from concentrated hydrochloric acid a product can be obtained which contains substantially less of the substituted $\alpha$-amino than is present in the original mixture. 6 parts of the mixture are boiled with 10 parts of concentrated hydrochloric acid, and after cooling to 75° C. the mixture is filtered. The $\alpha$-amino body is more soluble in the hot acid than the $\beta$-amino body.

*Example 6.*—This is a modification of Example 5. According to this example, the bodies are separated by the use of organic solvents.

Dealing more particularly with the mixture of amino-chlor-anthraquinones that is obtained by a ring closing of (3'-amino-4'-chlor)-2-benzoyl-benzoic acid, we have found that if the crude mixture is dissolved in organic solvents, the product that crystallizes out is generally the 2-amino-3-chlor body, and although with different solvents a varying degree of purification is obtained, yet as a rule the product that crystallizes out from the organic solvents contains appreciably less of the $\alpha$-amino-chlor isomer than the original mixture of amino-bodies, that was dissolved in the solvents, so that repeated crystallizations from organic solvents give the 2-amino-3-chlor isomer in a fairly pure state.

In this connection we have found that amongst the most suitable solvents may be mentioned aniline, nitrobenzene, tetrachlorethane and solvent naphtha. Phenol, cresol and such like bodies can also be used, as the halogenated amino-chlor anthraquinones are fairly soluble in this type of solvent. Acetic acid, pyridine, acetone and ethyl phthalate can be used, although we do not regard them as quite as effective as the first mentioned. We regard the degree of purification obtained with the ordinary alcohols such as the methyl and butyl alcohol as less satisfactory.

*Example 7.*—This deals with a preparation and separation of brom derivatives.

When brom-benzene is condensed with phthalic anhydride in the usual way, the product obtained—(4'-brom)-2-benzoyl-benzoic acid—can be nitrated and reduced to the (3'-amino-4'-brom)-2-benzoyl-benzoic acid. This product on ring closing in the usual way appears to give a mixture of two isomeric bodies which are apparently the 1-amino-2-brom-anthraquinone and the 2-amino-3-brom-anthraquinone. If this mixture of isomers is treated by the methods outlined above for the separation of the corresponding amino-chlor isomers they can be separated into 2-amino-3-brom anthraquinone and 1-amino-2-brom anthraquinone.

*Example 8.*—This deals with a method of separating isomers such as those prepared by the process of Example 7 by means of sulphuric acid. 5 parts of (3'-amino-4'-brom)-2-benzoyl-benzoic acid are dissolved in 30 parts monohydrate sulphuric acid, and the mixture is stirred for 15 minutes at 180° C. After cooling to 70° C. water is very slowly added to the mixture which is stirred until the concentration of the acid is reduced to 80%. The mixture is then stirred for a quarter of an hour at 80° C., cooled to 30° C., filtered, washed with 80% sulphuric acid, and then washed acid free with water.

The product obtained is a pale yellowish orange body of melting point 293–302° C. It contains substantially no brom α-amino anthraquinone, and when dissolved in sulphuric acid, gives a yellow solution. On recrystallization from chlor benzene, a product is obtained which melts at 305–306.5° C. The constitution of the body may be regarded as 2-amino-3-brom anthraquinone.

On brominating this body by treating it in water suspension with bromine, a reddish yellow product is obtained which melts at about 240° C. This body may be regarded as 1:3-dibrom-2-amino anthraquinone.

*Example 9.*—This deals with the working up of the filtrates of Example 8. The acid filtrates of Example 8 are drowned in water, and the precipitated body filtered off and washed acid free. It is a bright red colour and, when dissolved in sulphuric acid, gives a yellow solution. It melts at 203–215° C., and consists chiefly of 1-amino-2-brom anthraquinone which contains a very small percentage of β-amino anthraquinone.

*Example 10.*—This deals with a method of separation of the products obtained by the ring closing of (3'-amino-4'-methyl)-2-benzoyl-benzoic acid. A mixture is prepared comprising 15 parts (3'-amino-4'-methyl)-2-benzoyl-benzoic acid, and 90 parts monohydrate sulphuric acid.

The above mixture is heated at 180° C. for 15 minutes, cooled to 70° C., and sufficient water slowly added with stirring to reduce the concentration of the acid to 80%. The mixture is then stirred for a quarter of an hour at 80° C., cooled to below 30° C. and the sulphate which formed filtered off, washed with 80% sulphuric acid and then with water until acid free.

An orange coloured product is obtained containing substantially no α-amino anthraquinone body and which, recrystallized from chlor benzene, gives orange red crystals which melt at 259–260° C. It is soluble in sulphuric acid, giving a reddish yellow solution. The constitution of the body may be represented by 2-amino-3-methyl anthraquinone.

On brominating the body by treatment in water suspension with bromine an orange coloured product is obtained having a melting point of 192–193° C. This body may be regarded as 1-brom-2-amino-3-methyl anthraquinone.

General

The method of separation according to Example 8 and other examples herein given can also be applied to brominated mixed products, and in this way two different dibrom-amino-anthraquinones can be obtained, both of which are valuable intermediates for the production of dyestuffs.

The invention may be applied to anthraquinone derivatives, closely related to those referred to in the above examples, viz., those derived from (3'-amino-4'-substituted)-2-benzoyl-benzoic acids, for instance, those derived from (3'-amino-4'-halogen)-2-benzoyl-benzoic acid.

2-amino-3-chlor anthraquinone prepared as herein described is a substance which melts at about 310–311.5° C., the sulphate of which is substantially insoluble in sulphuric acid of a concentration of about 80%, but soluble in sulphuric acid of higher concentration.

The free amino body has a light yellowish-brown colour. On bromination, it yields a brominated-amino-chlor anthraquinone which condenses to form chlorinated indanthrones and flavanthrones.

We claim:—

1. As an article of manufacture, 2-amino-3-chlor-anthraquinone in such a state of purity as to have a melting point of about 310° C. to 311.5° C.

2. A process which comprises the separation of the products of ring-closure of 2-benzoyl-benzoic acid-3'-amino-4'-chlor by fractional precipitation from sulphuric acid of about 80% strength.

In testimony whereof we have signed our names to this specification.

HUGH ALBERT EDWARD DRESCHER.
WILLIAM SMITH.
JOHN THOMAS.